June 5, 1962
A. M. HANCIK
3,037,529
LAMINATED TUBE STRUCTURE AND METHOD
Filed Oct. 19, 1959
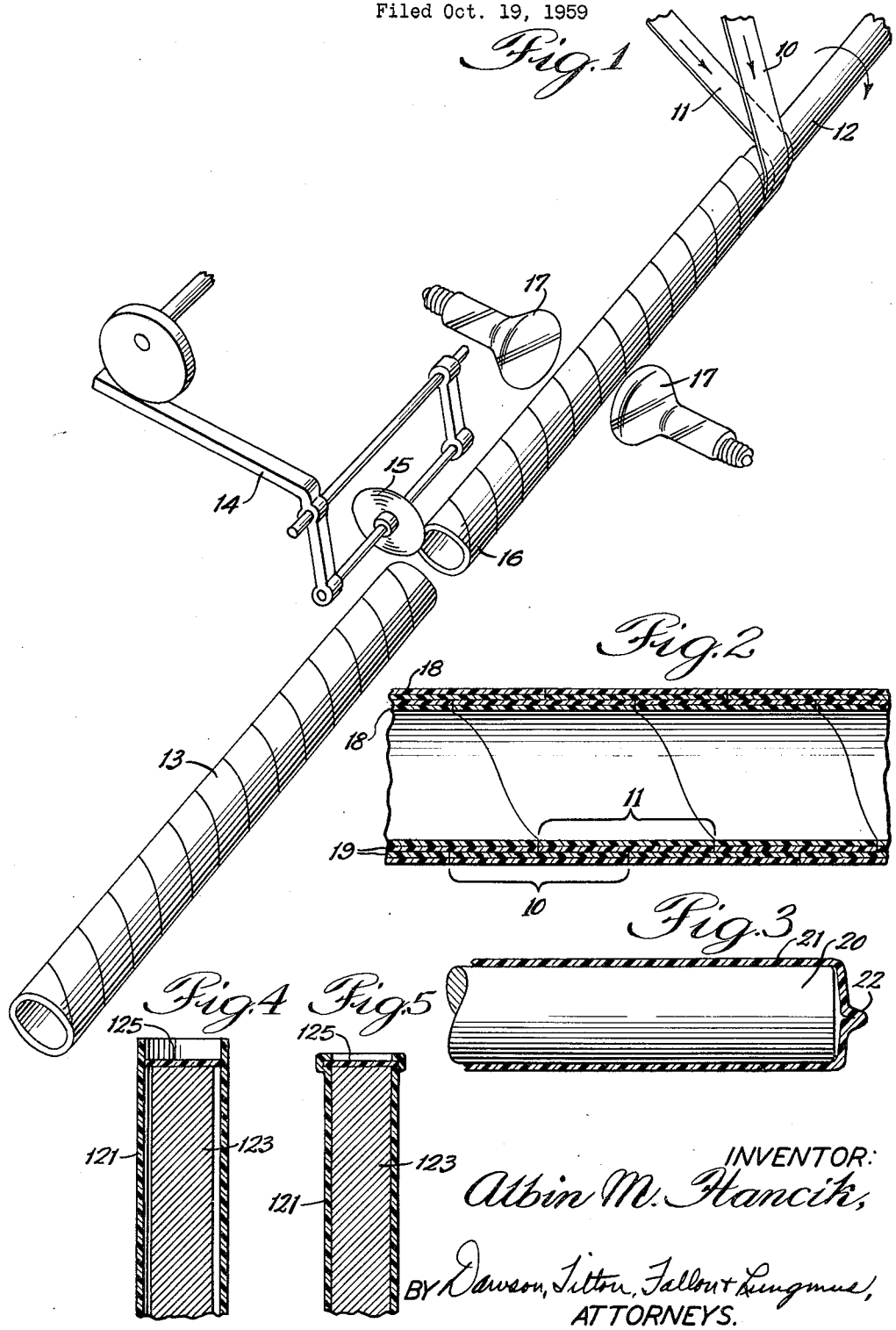
INVENTOR:
Albin M. Hancik,
BY Dawson, Tilton, Fallon + Lungmus,
ATTORNEYS.

United States Patent Office 3,037,529
Patented June 5, 1962

3,037,529
LAMINATED TUBE STRUCTURE AND METHOD
Albin M. Hancik, 2021 Clarence Ave., Lakewood, Ohio, assignor, by mesne assignments, of one-half to Albin M. Hancik, Lakewood, Ohio, and one-half to William A. Foll, Cleveland, Ohio
Filed Oct. 19, 1959, Ser. No. 847,329
5 Claims. (Cl. 138—109)

This invention relates to a laminated tubular structure and method, and, more particularly, to tubes constructed of dissimilar plastic materials.

It is a general object of this invention to provide a novel tubular structure which embodies a laminated construction employing dissimilar plastic materials. The tubes constructed according to this invention have the capacity of shrinking without having the layers of the laminate separate. As such, a useful covering is provided for a variety of mechanical and electrical fittings and one that may be expeditiously applied. Another object is to provide a method of forming a tubular enclosure wherein strips to be laminated are spirally wound and thereafter the spirally-wound structure is subjected to heat, whereby shrinkage is achieved but without separation of the laminated layers. Other objects and advantages of this invention can be seen as this specification proceeds.

The invention will be explained in conjunction with the accompanying drawing, in which—

FIG. 1 is a perspective elevational view of equipment employed in fabricating tubes embodying teachings of the invention;

FIG. 2 is an enlarged cross-sectional view of a tube constructed with the apparatus of FIG. 1;

FIG. 3 is an elevational view of a tube embodying teachings of the invention and applied to a fitting as a protective covering therefor;

FIG. 4 is a view similar to FIG. 3 but of a modified form of the invention; and

FIG. 5 is a view of the device of FIG. 4 in a subsequent stage of fabrication.

In the invention, two or more plastic laminated strips are provided, as indicated in FIG. 1 by the numerals 10 and 11. The numeral 12 in FIG. 1 designates an elongated mandrel. The mandrel 12 is provided as part of a spiral tube machine (not shown) in which the mandrel is stationary. The material from which a tube is to be made, i.e., the strips 10 and 11, is spiralled about the mandrel 12 and driven forward by a belt (not shown), which is lapped at an angle around the mandrel. All this is well established in the art, and it is believed that a detailed showing and description of a mandrel and the associated driving mechanism are not necessary to an understanding of the present invention.

Spirally wound upon the mandrel 12 are the strips or laminating layers 10 and 11. The spirally-wound tube issuing from the mandrel 12 is designated by the numeral 13, and this is separated into lengths by applying a knife assembly 14 including a cutter wheel 15 to the portion 16 of the tube extending from the mandrel 12. Prior to the knife cutting operation, the strips 10 and 11 are adhesively united by heating the spirally-arranged strips. In the embodiment shown, this is illustrated by the infra-red bulbs 17. It is to be appreciated that other uniting means may be employed.

Each of the webs or strips 10 and 11 may be a laminate of an oriented thermoplastic material 18 (see FIG. 2) and a thermoplastic material 19. Excellent results are obtained when the oriented thermoplastic material 18 is a resinous material such as Mylar, which is ethylene terephthalate produced by the Polychemicals Division of the E. I. du Pont de Nemours & Co., Inc., Wilmington, Delaware. This is an oriented modified polyester film provided in the esterification reaction between a polyhydric alcohol and a polybasic acid. It may conveniently be employed in the commercially available thicknesses ranging from .00025" to .0075". The thermoplastic resinous material may be polyethylene, or like acting compositions such as various polyvinyl resins, which are available from a number of commercial producers such as Bakelite Company, Du Pont, etc. Such polyethylene coated Mylar films are commercially available from Dobeckmun Co., a division of Dow Chemical Co., Cleveland, Ohio. The polyethylene films softens in the range 180–230° F., while the Mylar has a reorientation temperature considerably higher, approximately 350–450° F. As can be seen from FIG. 2, the polyethylene laminations of each web are disposed in adjacent abutting relation and conveniently heat-sealed to each other in the spiral winding operation.

A tube of the form seen in FIG. 2 and provided in the procedure seen in FIG. 1 may be conveniently employed to protect a metal shaft 20, as seen in FIG. 3, wherein the tube 21 has been heated as at 22 to close the end thereof. The tube 21 shrinks to close the end of the tube about the shaft 20, but without separation of the laminations or spiral windings, the polyethylene flowing under the imposition of a temperature above its melting-point to compensate for shrinkage of the Mylar, all while maintaining a firm bond between Mylar layers. Besides being a protective covering, the tube may be used as insulation for various electrical elements, such as condensers, coils, bus bars, etc.

Illustrative of the invention is the following example:

Example

Each strip 10 and 11 was made up of a ½" wide laminate of polyethylene and Mylar, each layer of the laminate having a thickness of the order of about one mil. The strips were arranged with the polyethylene layer outwardly in strip 11 and inwardly disposed in strip 10. The strips were laminated by being subjected to pressure in the presence of heat. After the spirally-wound tube was formed, it was encased about a cylindrical fitting which had a diameter just slightly less than the tube I.D. of $^{5}/_{16}$". The tube ends were subjected to heat of at least about 400° F., whereupon the ends closed to provide a water-tight case for the fitting as at 22 in FIG. 3. The generally achievable shrinkage is of the order of about 30% in both directions. When this shrinkage is inadequate to close the tube ends, it is possible to utilize the invention to equip the tube with separate closures, as seen in FIGS. 4 and 5. In FIG. 4, the numeral 123 designates a mandrel or other supporting element, on which a tube 121 is loosely mounted, the tube 121 being essentially the counterpart of tube 21 in FIG. 3. The assembly is further equipped with a disc 125 positioned at the end of the mandrel 123 and within the outer end of the tube or sleeve 121.

Now referring to FIG. 5, it will be noted that the tube 121 has effectively integrated the disc 125 and this structure is achieved by the application of sufficient heat to raise the tube 121 to about the reorientation temperature of the thermosetting component of the tube 121. Thereafter, the tube 121, now equipped with the end closure in the form of the disc 125, can be stripped from the mandrel and a closed-ended container is available.

Where the advantageous shrinkage of the tube is desired with laminates made up of dissimilar plastic materials, the best results are obtained when the reorientation temperature of the oriented thermoplastic material is sufficiently higher than the softening point of the thermoplastic material, i.e., of the order of at least about 100° F.

In certain applications, it might be desirable to employ several strips, such as those designated 11 and 10 in the drawing, in making up the tube. Where, for example, a three-layer tube is desired, this can be conveniently done by providing the center strip with polyethylene laminations on both sides. In certain other instances, it may be possible to eliminate one of the mating polyethylene layers if the Mylar or other thermosetting material has been previously treated so as to render it receptive to bonding with polyethylene.

While in the foregoing specification I have set forth a detailed explanation of an embodiment of the invention for the purpose of illustration thereof, many variations in the details herein given will be appreciated by those skilled in the art without departing from the spirit and scope of the invention.

I claim:

1. As a new article of manufacture, a tube comprising a plurality of spirally-wound layers of flexible resinous material, each layer comprising
   a laminate of a first plastic material characterized by being thermally oriented and having a high reorientation temperature,
   a second plastic material having a melting point lower than said reorientation temperature,
   said layers being arranged with said second plastic material in face-to-face, united relation,
   said tube being heat-shrinkable whereby an end of said tube is heat-constricted radially inwardly, said second plastic material circumferentially bonding said first material at said end concentrically with respect to the axis of said tube, thereby preventing delamination of said layers.

2. The article of claim 1 in which said first plastic material is ethylene terephthalate and said second plastic material is polyethylene.

3. In a method of forming a tubular enclosure, the steps of
   spirally winding strips of resinous material each strip comprising a laminate of a thermally oriented thermoplastic material and a second thermoplastic resinous material,
   uniting the second thermoplastic laminae of each strip, and
   subjecting the tube resulting from the spirally-wound strips to heat said tube being heat-shrinkable whereby an end of said tube is heat-constricted radially inwardly, said second thermoplastic material circumferentially bonding said thermally-oriented thermoplastic material at said end concentrically with respect to the axis of said tube, thereby preventing delamination of said layers.
   the said oriented material having a reorientation temperature above the softening temperature of said second thermoplastic resinous material.

4. The method of claim 3 in which the oriented material is ethylene terephthalate and the thermoplastic material is polyethylene.

5. The method of claim 3 in which the difference between the said temperatures is about 100° F.

References Cited in the file of this patent

UNITED STATES PATENTS

| | | |
|---|---|---|
| 1,997,877 | Spanel | Apr. 16, 1935 |
| 2,307,817 | Austin | Jan. 12, 1943 |
| 2,748,805 | Winstead | June 5, 1956 |
| 2,748,830 | Nash et al. | June 5, 1956 |
| 2,828,237 | Rosser | Mar. 25, 1958 |
| 2,890,552 | Henderson | June 16, 1959 |
| 2,923,404 | Adell | Feb. 2, 1960 |

FOREIGN PATENTS

| | | |
|---|---|---|
| 426,788 | Great Britain | Apr. 5, 1935 |